Oct. 3, 1944.   I. F. SCHRECK   2,359,493
LIFT TRUCK
Filed July 3, 1941   3 Sheets-Sheet 1
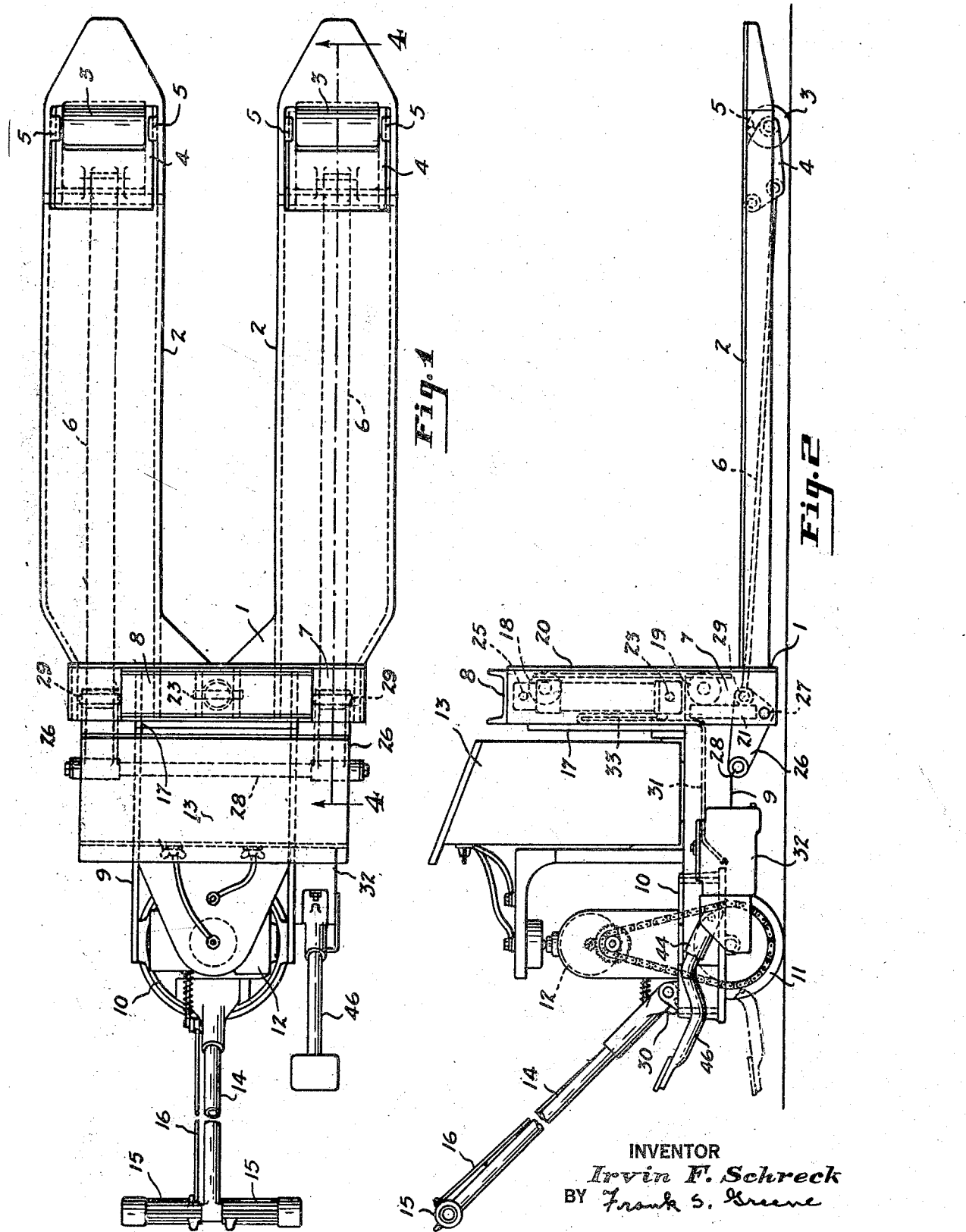
INVENTOR
*Irvin F. Schreck*
BY *Frank S. Greene*
ATTORNEY Oct. 3, 1944.  I. F. SCHRECK  2,359,493
LIFT TRUCK
Filed July 3, 1941   3 Sheets-Sheet 2
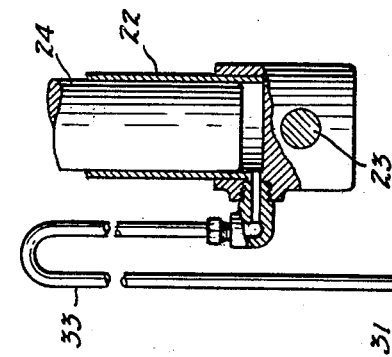
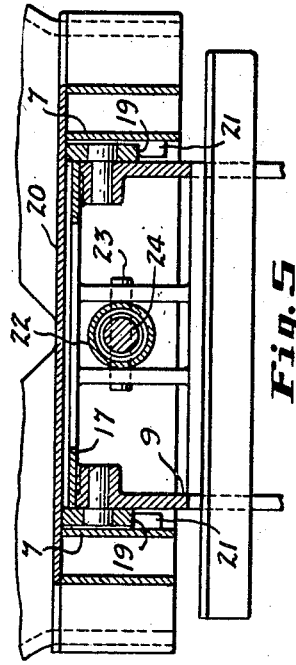
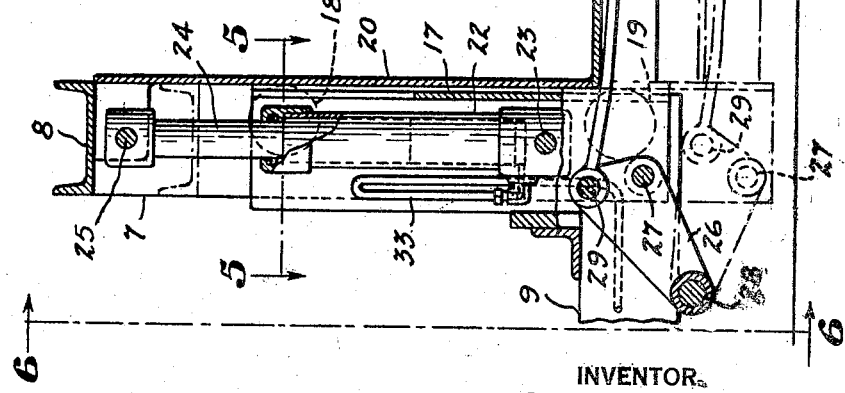
INVENTOR.
Irvin F. Schreck
BY Frank S. Greene
ATTORNEY Oct. 3, 1944.  I. F. SCHRECK  2,359,493
LIFT TRUCK
Filed July 3, 1941  3 Sheets-Sheet 3
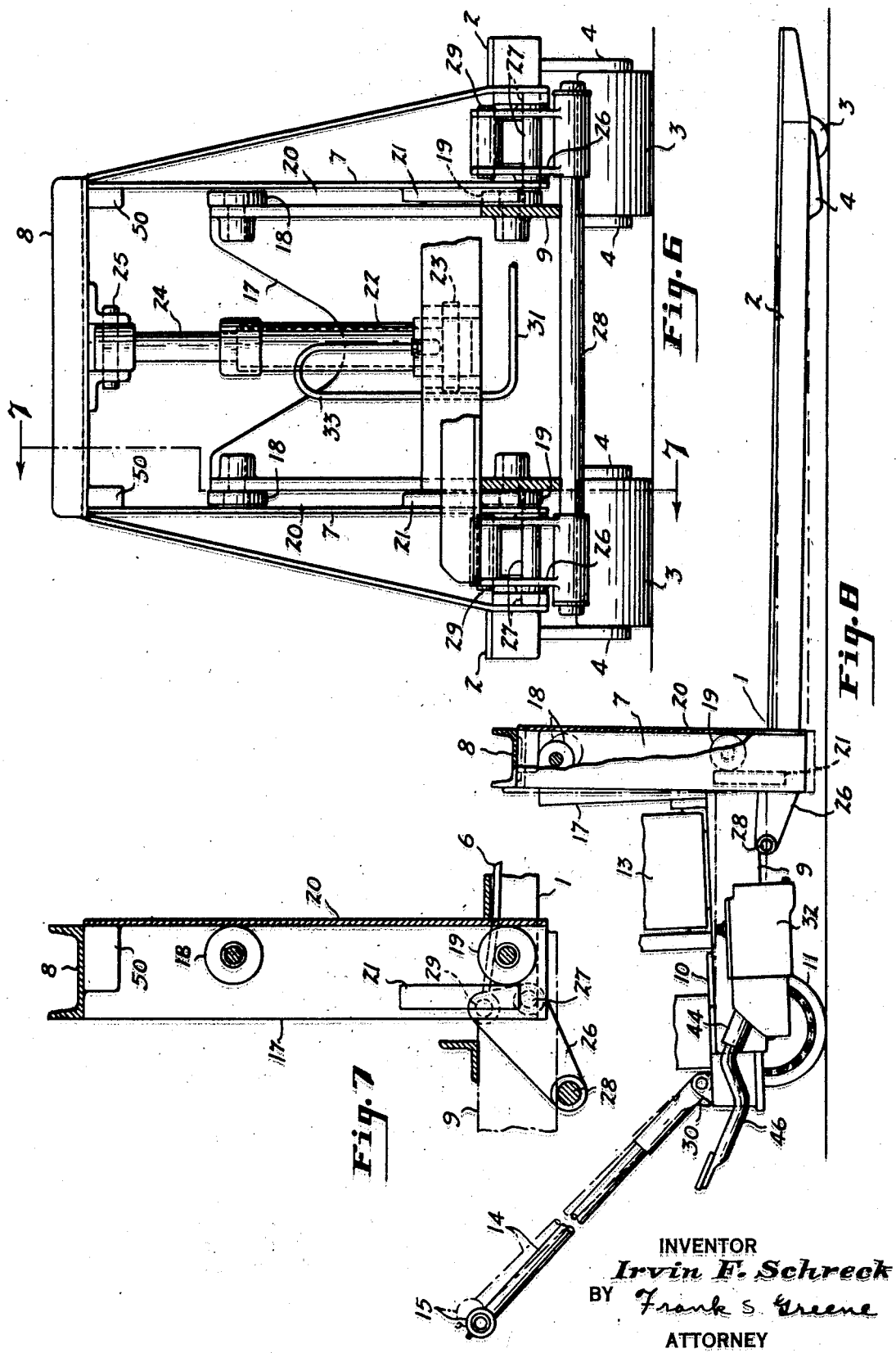
INVENTOR
*Irvin F. Schreck*
BY *Frank S. Greene*
ATTORNEY Patented Oct. 3, 1944

2,359,493

UNITED STATES PATENT OFFICE 2,359,493

LIFT TRUCK

Irvin F. Schreck, Cleveland Heights, Ohio

Application July 3, 1941, Serial No. 400,941

10 Claims. (Cl. 254—2)

This invention relates to lift trucks, and more particularly to trucks of the type known as hand trucks such as are commercially used for transporting loads from place to place in factories or warehouses.

The present invention has for an object to provide a wheeled load lifting and supporting unit so connected to a tractor unit that it may be readily detached and replaced with another load carrying unit, whereby load carrying units varying in length or in form and designed to handle different kinds of loads may be used interchangeably with the same tractor unit.

More specifically, the present invention provides a truck of the character referred to which consists of a tractor unit and a wheeled load supporting unit detachably coupled together, the tractor unit being motor propelled and provided with a hoist and the load carrying unit being so connected to the tractor unit and hoist that the load carrying frame is adjusted vertically with respect to the tractor and with respect to its supporting wheels by the operation of the hoist.

A further object of the invention is to provide tractor and load carrying units coupled together and having frames which are supported by wheels remote from the coupling between the frames, the frames being pivotally coupled together and provided with thrust members which limit the downward movements of the pivotally connected ends but which permit an upward movement of the pivotally connected ends upon a rocking movement of the tractor frame.

A further object of the invention is to facilitate the travel of unloaded trucks by providing the tractor unit with a controlling and steering tongue which extends beyond the end of the tractor frame and which has a part engageable with the tractor frame to impart a tilting movement to the tractor frame to lift the end of the tractor frame which is coupled to a load carrying unit.

A further object of the invention is to provide in connection with a tractor unit, a load lifting and carrying frame provided with adjustable supporting wheels at one end thereof and with an actuator for adjusting the wheels extending to the end of the frame coupled to the tractor frame which is operated upon a relative vertical movement of the two frames.

A further object of the invention is to provide an improved pedal operated hydraulic hoist by means of which the load carrying units may be quickly and easily raised or lowered.

With the above and other objects in view the invention may be said to comprise a truck as illustrated in the accompanying drawings hereinafter described and particularly set forth in the appended claims, together with such variations and modifications thereof as will be apparent to one skilled in the art to which the invention pertains.

Reference should be made to the accompanying drawings forming a part of this specification, in which:

Figure 1 is a top plan view of a truck embodying the invention;

Fig. 2 is a side elevation of the truck;

Fig. 3 is a fragmentary sectional view showing the hydraulic hoist and the pump connected to the hoist cylinder;

Fig. 4 is a section taken on the line indicated at 4—4 in Fig. 1;

Fig. 5 is a section taken on the line indicated at 5—5 in Fig. 4;

Fig. 6 is a section taken on the line indicated at 6—6 in Fig. 4;

Fig. 7 is a section taken on the line indicated at 7—7 in Fig. 6; and

Fig. 8 is a side elevation of the truck showing the tractor frame in tilted position and the coupled ends of the tractor and load carrying frames elevated.

In the accompanying drawings the invention is shown applied to a lift truck provided with a load carrying frame adapted for the handling of loaded skids, the load carrying frame when in its lowermost position being adapted to enter beneath the skid and having sufficient vertical movement to elevate the skid to a position clear of the floor for transportation.

As herein shown, the load carrying frame 1 has parallel forks 2 which are disposed horizontally and which are adapted to enter the space beneath a load supporting skid. Each of the forks 2 is provided with a supporting wheel 3 adjacent its outer end, each wheel 3 being mounted on an arm 4 which is pivoted to the fork 2. Each of the forks is provided with stops 5 with which the arms 4 engage to limit the downward movement of the load carrying frame with respect to the supporting wheels 3. Actuating rods 6 are connected to the wheel carrying arms 4 to adjust the arms with respect to the load carrying frame, the actuating rods 6 being actuated by means which will presently be described. At the inner ends of the forks 2 the load carrying frame 1 is provided with guide standards 7 which are connected at their upper ends by a cross bar 8, the end of the load carrying frame carrying the standards 7 being adapted to be connected to a tractor frame 9 for vertical movement with respect to the tractor frame.

The tractor frame 9 has a propelling unit 10 swivelled therein for turning movement about a vertical axis adjacent the end of the frame 9 opposite that to which the load carrying frame is connected. The propelling unit 10 carries a tractor wheel 11 which is driven forwardly or backwardly by an electric motor 12 which receives current from a battery 13 supported upon the tractor frame. A steering and controlling tongue 14 is pivoted to the propelling unit 10 to swing vertically and is provided on the hand grip portions thereof with sleeves 15 which control the motor through a rod 16 connected thereto. The tractor unit steering, driving, and controlling mechanisms are not described in detail herein for the reason that these mechanisms are not, per se, part of the present invention and are shown and described in my Patent No. 2,209,356, granted July 30, 1940.

The tractor frame 9 is provided at the end thereof, which is coupled to the load carrying unit, with a standard 17 which is received between the guide standards 7 of the load carrying frame. The standard 17 is provided with upper and lower thrust rollers 18 and 19 which bear against a plate 20 attached to the guide standards 7. The guide standards 7 are provided adjacent their lower ends with short vertically disposed stops 21 spaced from the plate 20 a distance sufficient to receive the lower rollers 19 between the stops and the plate 20, so that endwise play between the tractor and the load carrying frames is prevented.

Engagement of the plate 20 with the upper thrust rollers 18 limits the pivotal movement of the load carrying frame with respect to the tractor frame so that the load carrying portion of the frame 1 is normally held in a horizontal position.

A suitable hoist is provided for raising and lowering the adjoining end of the load carrying frame with respect to the tractor frame. The hoist herein shown comprises a hydraulic cylinder 22 connected by a pivot 23 at its lower end to the tractor frame and a piston 24 detachably connected by means of a pivot pin 25 to the cross bar 8 of the load carrying frame.

Means is provided for automatically actuating the wheel carrying arms 4 through the rods 6 upon operation of the hoist. The actuating means comprises a lever having arms 26 connected to opposite sides of the load carrying frame by axially aligned pivots 27 and connected by a cross bar 28 which extends across the space between the arms 26 beneath the tractor frame 9. The actuating rods 6 are connected by pivots 29 to the arms 26. When the load carrying frame 1 is in its lowermost position, as shown in Fig. 2, the wheel carrying arms 4 are in substantially horizontal position and in engagement with the stops 5. When the end of the load carrying frame connected to the tractor is lifted by means of the hydraulic hoist, the lever arms 26 are rocked to the position shown in Fig. 4, causing the actuating rod 6 to be pulled in a direction to swing the wheel carrying arms 4 downwardly with respect to the forks 2 so that the outer end of the load carrying frame is moved upwardly simultaneously with the inner end thereof which is connected to the hoist.

In the lowermost position of the forks shown in Fig. 2, the forks are adapted to run beneath a load supporting skid and upon actuation of the hoist the load carrying frame is elevated to lift the skid clear of the floor so that the load may be conveyed by the truck. It is generally preferable that the hoist be operated only when picking up or discharging a load and that the truck, when unloaded, be operated with the load carrying platform in its lowermost position. However, the load carrying platform may be of considerable length and in its lowermost position is quite close to the floor. In passing over thresholds or floor surfaces which have irregularities the inner end portions of the load carrying frame may contact with the floor or with the projections on the floor surface and impede the movement of the truck. In order to overcome this difficulty the tractor frame is permitted to have an upward tilting movement with respect to the load carrying frame, the upper end of the standard 17 carrying the roller 18 being free to move away from the plate 20, as shown in Fig. 8 of the drawings. Such upward tilting of the tractor frame 9 lifts the end of the load carrying frame connected to the tractor frame so that the inner end of the load carrying frame may be elevated clear of obstacles on the floor which would otherwise impede the movement of the truck. In order to enable the operator to quickly and easily rock the tractor frame 9 upon the tractor wheel 11 as a fulcrum, the steering tongue 14 is provided with a lug 30 which is engageable with the tractor frame 9 to limit the downward movement of the tongue with respect to the frame, and since the tongue projects a considerable distance beyond the end of the frame, the operator may readily tilt the frame 9 by pressing down upon the outer end of the tongue 14 to tilt the tractor frame and elevate the end of the load carrying frame connected thereto to clear obstacles which would otherwise impede the travel of the unloaded truck.

Liquid under pressure is supplied to the cylinder 22 through a pipe 31 connected to a liquid reservoir 32 mounted on the frame 9 below the cylinder. In order to permit a slight pivotal movement of the cylinder 22 with respect to the frame 9 when the frame 9 is tilted, the pipe 31 is provided with an upstanding loop 33 at the end thereof connected to the cylinder, the pipe and the loop portion thereof having sufficient flexibility to permit a limited pivotal movement of the cylinder 22. The pipe 31 communicates at the end opposite that connected to the cylinder 22 with a cored passage 34 in a wall of the reservoir 32, the passage 34 communicating with a port 35 provided with a check valve 36 and opening into a cylinder 37. The cylinder 37 is provided with a second port 38 provided with a check valve 39, through which liquid from the reservoir 32 may enter the cylinder. The cylinder 37 is provided with a piston 40 and the check valve 39 is held closed by the pressure of liquid in the cylinder, so that when the piston 40 is moved outwardly the valve 39 opens to permit the cylinder to fill with liquid from the reservoir 32, and the check valve 36 is so positioned that it is opened by the pressure of liquid in the cylinder, so that, when the piston 40 is moved inwardly, it forces liquid through the port 35, passage 34, and pipe 31 into the hoist cylinder 22. The piston 40 is attached to a crosshead 41 which is slidable on fixed pins 42 and springs 43 are interposed between the crosshead 42 and the cylinder head to normally hold the piston 40 in a retracted position. A treadle lever 44 is connected to the crosshead 42 and to the frame 9 by a pivot 45, the lever 44 having a treadle arm 46. The spring 43 serves to hold the treadle arm 46 in an elevated position, but the tread lever may be moved manually to lift the treadle arm 46 above the position at which it is normally held by the spring. When it is desired to elevate the load carrying frame, liquid is pumped from the reservoir 32 into the cylinder 22 by means of the treadle lever 44, the arm 46 being pressed downwardly and then allowed to return to its upper position under the pressure of the spring 43 after each actuation. When it is desired to lower the load carrying frame the treadle arm 46 is lifted above the position in which it is held by the spring 43. This upward movement of the treadle arm 46 brings a lug on the lever 44 into engagement with a normally closed valve 48 which controls a port 49 opening from the passage 34 into the reservoir 32. The opening of the valve 48 permits the liquid in the cylinder 22 to flow by gravity from the cylinder into the reservoir 32, allowing the load carrying frame to move downwardly to its lowermost position shown in Fig. 2. Stops 50 attached to the underside of the cross bar 8 are engageable with the rollers 18 to limit the downward movement of the load carrying frame with respect to the tractor frame, so that the piston 24, in its lowermost position, is spaced slightly above the bottom of the cylinder 22 with the entire area of its bottom face exposed to the liquid forced into the cylinder under pressure through the pipe 31.

The load carrying unit may be readily detached from the tractor unit by removing the pin 25 connecting the hoist to the load carrying frame and lifting the load carrying frame sufficiently to raise the stops 21 clear of the lower thrust rollers 19. It will be apparent that the size and form of the load carrying unit is dependent largely upon the kind of loads which it is designed to handle. When it is advantageous to employ a truck of the type contemplated by the present invention for handling different kinds of loads, interchangeable load carrying units may be provided for use with a single tractor unit. Since the cost of the load carrying units is small as compared to the cost of the tractor unit, considerable economy may be effected by the use of such interchangeable load carrying units.

It is to be understood that variations and modifications of the specific devices herein shown and described for purposes of illustration, may be made without departing from the spirit of the invention.

What I claim is:

1. A lift truck comprising a tractor unit and a load carrying unit having frames coupled end to end in longitudinal alignment, interengaging vertically disposed guide members carried by said frames at the adjoining ends thereof having engaging portions which hold said units against relative endwise movements, wheels supporting said frames at the ends thereof remote from the coupled ends, the wheels of the load carrying frame being connected to the latter frame for movement vertically with respect thereto, means for propelling the tractor unit, means for raising or lowering the coupled end of the load carrying frame with respect to the tractor frame, and means controlled by the raising or lowering of said coupled end of the load carrying frame for simultaneously lowering or raising the wheels at the opposite end of the load carrying frame with respect to the latter frame.

2. A lift truck comprising a tractor unit and a load carrying unit having frames detachably coupled end to end, interengaging vertically disposed guide members carried by the frames at the adjoining ends thereof, wheels supporting the remote ends of said frames, the wheels of the load carrying frame being connected to the latter frame for vertical movement with respect thereto, means for propelling the tractor unit, a hoist mounted on the tractor frame and connected to the adjoining end of the load carrying frame for raising and lowering the same, a lever pivoted to said load carrying frame and having an arm engaging the underside of the tractor frame whereby the lever is rocked about its pivot upon vertical movement of the load carrying frame with respect to the tractor frame, and means actuated by said lever for lowering or raising the load carrying frame supporting wheels with respect to the load carrying frame.

3. A lift truck comprising a tractor unit and a load carrying unit having frames detachably coupled end to end, interengaging vertically disposed guide members carried by the frames at the adjoining ends thereof, wheels supporting the remote ends of said frames, arms connected by horizontal pivots to the load carrying frame, supporting wheels carried by said arms, a lever pivoted to the load carrying frame and having an arm engaging the underside of the tractor frame, links connecting said lever to said arms, means for propelling the tractor unit, and a pedal operated hoist mounted on the tractor frame and connected to said load carrying frame.

4. In a lift truck the combination with a tractor unit comprising a frame having a support swiveled therein adjacent one end thereof, a traction wheel carried by the support, a steering handle attached to said support, means for driving the traction wheel and a substantially upright guide member adjacent the opposite end of the frame, of a load carrying unit comprising a load supporting frame having a substantially upright guide member at one end engaging the guide member in the tractor frame and supporting wheels connected to the opposite end of the load carrying frame for vertical movement with respect thereto, a hoist carried by the tractor frame and connected to the adjacent end of the load carrying frame, and means controlled by the relative vertical movements of the adjoining ends of the frames for lowering or raising said supporting wheels with respect to the load carrying frame.

5. In a lift truck the combination with a tractor unit comprising a frame having a support swiveled therein adjacent one end thereof, a traction wheel carried by the support, a steering handle attached to said support, means for driving the traction wheel and a substantially upright guide member adjacent the opposite end of the frame, of a load carrying unit comprising a load carrying frame having a substantially upright guide member at one end engaging the guide member on the tractor frame, arms pivoted to the load carrying frame adjacent its opposite end, supporting wheels carried by said arms, a lever pivoted to said load carrying frame and having an arm engaging the underside of the tractor frame, links connecting said lever to said wheel carrying arms, and a hoist mounted on the tractor frame and connected to the adjacent end of said load carrying frame.

6. In a lift truck comprising a tractor unit and a load carrying unit having frames pivotally connected end to end for relative vertical rocking movements, supporting wheels for each of said frames spaced from the connected ends thereof upon which said frames may rock vertically, interengaging thrust elements carried by said frames at their adjoining ends for limiting the downward movement of the pivotally connected ends, said thrust elements being positioned to normally hold the load carrying frame in substantially horizontal position, and a handle attached to the tractor frame by which said frame may be rocked to lift the coupled ends of said frames.

7. A lift truck comprising a tractor unit having a frame, a support swiveled in the frame adjacent one end thereof, a traction wheel carried by said support, means for driving the traction wheel, a load carrying unit having a frame pivotally connected to the end of said tractor frame remote from said swiveled support, axially aligned supporting wheels for the load carrying frame about which said load carrying frame may have vertical rocking movements, interengaging thrust elements carried by said frames at their adjoining ends for limiting the downward movement of the pivotally connected ends thereof, and a steering handle connected to said swiveled support by a horizontal pivot, said handle having a portion engageable with the tractor frame to limit the downward movement of the handle whereby said tractor frame may be rocked upon the traction wheel to lift the pivotally connected ends of said frames.

8. In a lift truck a tractor unit having a frame, a load carrying frame connected to said tractor frame for vertical movement with respect thereto, a hydraulic hoist comprising a cylinder and a piston connected, one to the tractor frame and the other to the load carrying frame, a reservoir for liquid carried by the tractor frame, a pump comprising a cylinder connected to the reservoir and to the hoist cylinder and a piston in the cylinder operable when moved in one direction to force liquid into the hoist cylinder, a treadle lever for operating said piston, a spring acting upon the lever and piston for normally holding said lever in an elevated position, and means operated by said lever when it is lifted above the position in which it is normally held by the spring for draining liquid from said hoist cylinder into said reservoir.

9. In a lift truck comprising a tractor unit and a load carrying unit having frames pivotally connected end to end for relative vertical rocking movements, supporting wheels for each of said frames spaced from the connected ends thereof upon which said frames may rock vertically, interengaging thrust elements carried by said frames at their adjoining ends for limiting the downward movement of the pivotally connected ends, said thrust elements being positioned to normally retain said load carrying frame in substantially horizontal position, and means for tilting the tractor unit frame to lift the coupled ends of said frames.

10. A lift truck comprising a tractor unit and a load carrying unit having frames detachably coupled end to end, interengaging vertically disposed guide members carried by the frames at the adjoining ends thereof, wheels supporting the remote ends of said frames, arms connected by horizontal pivots to the load carrying frame, supporting wheels carried by said arms, a lever pivoted to the load carrying frame and having an arm engaging the underside of the tractor frame, links connecting said lever to said arms, means for propelling the tractor unit, and means for raising or lowering the coupled end of the load carrying frame with respect to the tractor frame.

IRVIN F. SCHRECK.